United States Patent [19]

Kramb

[11] Patent Number: 5,088,282
[45] Date of Patent: Feb. 18, 1992

[54] PROCESS AND APPARATUS FOR THE REMOVAL OF SOOT AND CONDENSABLE MATTER FROM DIESEL EXHAUST GASES

[75] Inventor: Jan Kramb, Simmern, Fed. Rep. of Germany

[73] Assignee: Kramb Mothermik GmbH & Co. KG, Simmern, Fed. Rep. of Germany

[21] Appl. No.: 618,509

[22] Filed: Nov. 28, 1990

[30] Foreign Application Priority Data

Dec. 8, 1989 [DE] Fed. Rep. of Germany ....... 3940677

[51] Int. Cl.⁵ ............................................... F01N 3/02
[52] U.S. Cl. ........................................ 60/274; 60/275; 60/309; 60/321
[58] Field of Search .................. 60/274, 275, 309, 321, 60/320, 295, 311

[56] References Cited

U.S. PATENT DOCUMENTS

| | | | |
|---|---|---|---|
| 3,100,146 | 8/1963 | Huntington | 60/275 |
| 4,249,375 | 2/1981 | Grundmann | 60/321 |
| 4,319,453 | 3/1982 | Mann | 60/309 |
| 4,593,748 | 6/1986 | Kramb | 60/320 |

FOREIGN PATENT DOCUMENTS 346803 12/1989 European Pat. Off. .
923431 4/1963 United Kingdom .

Primary Examiner—Douglas Hart
Attorney, Agent, or Firm—Wenderoth, Lind & Ponack

[57] ABSTRACT

Hot exhaust gases from individual cylinders of a diesel engine are cooled and partially cleansed in respective selected heat exchangers. The cooled and partially cleansed exhaust gases discharged from the plurality of heat exchangers are combined and then passed to a single electrostaic precipitation device for further cleansing. When it becomes necessary to regenerate one or more of the heat exchangers, only a single heat exchanger is transferred to a regeneration mode of operation. At this time, all of the other heat exchangers continue to operate in the partial cleansing mode. During the regeneration of the one heat exchanger, the exhaust gases therefrom continue to be mixed with the exhaust gases of the remainder of the heat exchangers. All of the exhaust gases from a given cylinder of the engine always pass through only a single of the heat exchangers.

9 Claims, 1 Drawing Sheet

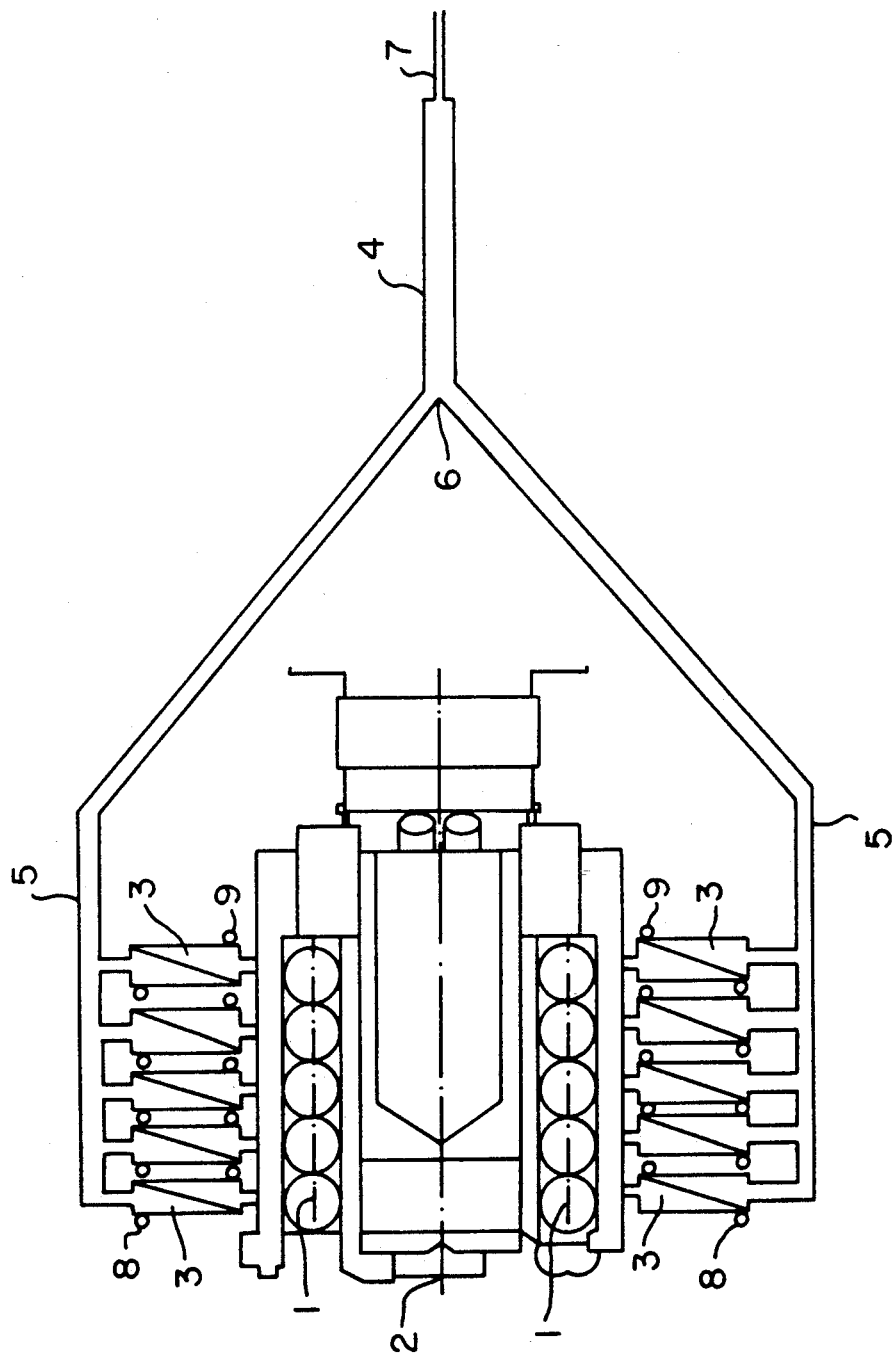

PROCESS AND APPARATUS FOR THE REMOVAL OF SOOT AND CONDENSABLE MATTER FROM DIESEL EXHAUST GASES

BACKGROUND OF THE INVENTION

The present invention relates to a process and apparatus for the removal of soot and condensable particles from the exhaust gases of a diesel engine.

Disclosed in U.S. Pat. No. 4,593,748 is a process for cleansing of hot exhaust gases from an engine, particularly a diesel engine, wherein the hot exhaust gases are cooled on surfaces of a heat exchanger cooled by a heat transfer medium. This causes the precipitation on surfaces of the heat exchanger of soot particles and volatile, condensable matter within the hot exhaust gases. This achieves a partial cleansing of the exhaust gases. Eventually, the precipitated soot and condensable matter accumulates on the surfaces of the heat exchanger, and when the heat exchanger surfaces largely or completely become saturated, such precipitate must be removed, i.e. the heat exchanger must be regenerated. This is done essentially by a self-heating and self-ignition process. However, complete removal of the precipitated soot and condensable matter is difficult by this procedure.

British GB-PS 293,431 discloses a further process for the removal of soot and volatile, condensable matter from diesel engine exhaust gases. In this process, the hot diesel engine exhaust gases are cooled on cold or cooled surfaces in a heat exchanger, thereby achieving partial cleansing with partial precipitation of soot and volatile, condensable matter. Additional cleansing and precipitation of residual soot and volatile, condensable matter occurs on additional precipitation surfaces, particularly in an electrostatic precipitation device. This procedure however discloses nothing regarding regeneration of the heat exchanger.

European EP 0 346 803 discloses an arrangement for the continuous removal of soot and volatile, condensable matter from diesel engine exhaust gases, wherein the hot exhaust gases alternately are conveyed through two heat exchangers, with a heat transfer medium acting on a secondary side of each heat exchanger and cooling the exhaust gases on a primary side of each heat exchanger. In this process, when one heat exchanger becomes partially or completely saturated with soot particles and condensed matter, the heat transfer medium supply to such heat exchanger is stopped. As a result, the hot exhaust gases heat the heat exchanger and the soot particles and condensed matter such that they burn off. The hot exhaust gases then are passed through another heat exchanger wherein partial cleansing of the hot exhaust gases occurs, with resultant precipitation of soot and condensable matter. The cooled exhaust gases containing residual soot and condensed matter then are conveyed through, for example, electrostatic precipitation devices. The operation of the plural heat exchangers is alternate between partial cleansing and regeneration.

SUMMARY OF THE INVENTION

With the above discussion in mind, it is an object of the present invention to provide a process and apparatus for the removal of soot and condensable matter from exhaust gases of a diesel engine, whereby such operation can be carried out continuously with only a single electrostatic precipitation device, and whereby regeneration of heat exchangers can be carried out without interruption of the operation of the diesel engine while at the same time allowing continuous operation of the electrostatic precipitation device.

This and other objects of the present invention are achieved by the provision of a process and apparatus whereby there are provided a plurality of heat exchangers, with each heat exchanger being operable for partial cleansing and for regeneration independently of the operation of the other of the heat exchangers. The hot exhaust gases from each of the cylinders of the diesel engine are individually passed through only a selected respective one of the heat exchangers. That is, all of the hot exhaust gases from a given of the cylinders of the diesel engine are passed through a selected respective single one of the heat exchangers. The arrangement may be such that the hot gases from all of the cylinders of the diesel engine are individually supplied to respective single heat exchangers, or alternatively the hot exhaust gases from pairs of the cylinders of the diesel engine may be supplied to respective single heat exchangers. In other words, if the diesel engine includes, for example, six cylinders, then the apparatus of the present invention may include six individually operable heat exchangers, with the hot exhaust gases from each of the six cylinders being passed through selected respective of the six heat exchangers. Alternatively, there could be provided three heat exchangers, and the hot exhaust gases from respective pairs of the cylinders of the diesel engine could be supplied to each of the three heat exchangers. The important feature of the present invention is that all of the exhaust gases from each individual cylinder of the diesel engine pass only through one given heat exchanger of the plurality of heat exchangers, and this is true both during partial cleansing by the heat exchanger and regeneration of the heat exchanger.

Furthermore in accordance with the present invention, when it becomes necessary for regeneration of the heat exchangers, only a single heat exchanger is operated for regeneration at a given time, and all of the remainder of the plurality of heat exchangers are operated for normal partial cleansing. Furthermore in accordance with the present invention, at all times the exhaust gases issuing from all of the plurality of heat exchangers are combined and then passed to the single electrostatic precipitation device. In other words, when one of the heat exchangers is being regenerated, then the hot exhaust gas discharged therefrom is combined with the cooled and partially cleansed exhaust gases issuing from all of the other heat exchangers, and this combined or mixed gas then is passed to the electrostatic precipitation device for further cleansing thereby.

In accordance with a further feature of the present invention, when a given heat exchanger is operated for regeneration thereof, i.e. to remove by self-heating and self-ignition the soot precipitate and condensed matter thereon, then after the completion of such regeneration operation, the supply of fuel to an injection nozzle of that respective cylinder of the diesel engine is interrupted. This of course interrupts the supply of hot exhaust gases from that cylinder to that regenerated heat exchanger, and this enables the heat exchanger to be cooled down from the high temperature thereof during the regeneration operation. When such regenerated heat exchanger is sufficiently cooled, then the fuel again is supplied to the respective cylinder and such heat exchanger is returned to a normal, partial cleansing operation.

Thus, in accordance with the present invention, in a given heat exchanger, a heat transfer medium cools secondary surfaces of the heat exchanger and thereby cools hot diesel exhaust gases on primary surfaces of such heat exchanger. This causes precipitation of soot and condensation of condensable matter on such primary surfaces. When this precipitation/condensation occurs to an extent that the heat exchanger must be regenerated to be able to efficiently perform partial cleansing, then the ability of the heat transfer medium to achieve cooling is interrupted, for example the supply of the heat of transfer medium may be interrupted. The continued supply of the hot exhaust gases to the primary surfaces of the heat exchanger causes such surfaces and the precipitated soot and condensed matter to be heated. Since the volatile matter of the exhaust gases, that have condensed on the primary surfaces, has a considerably lower ignition point than the precipitated soot, then the increased temperature thereof will cause spontaneous ignition of the volatile, condensed matter which will be allowed to burn off. This also will at the same time burn off the precipitated soot which generally has a considerably higher spontaneous ignition temperature. Condensable matter of the diesel exhaust gases readily would be understood by one skilled in the art to include all volatile substances, primarily hydrocarbons, that are condensable at the temperatures prevailing at the surfaces of the heat exchangers. In accordance with the present invention, the self-ignition temperature to achieve regeneration of the heat exchangers may be as low as 300° C.

The heat exchangers employed in accordance with the present invention may be cooled by heat a transfer medium in the form of a gaseous medium such as air, or by a liquid medium, preferably water.

After complete or partial saturation of the heat exchanger surfaces with the precipitated soot and condensed matter from the hot diesel exhaust gases, the heat transfer medium flowing on the secondary side of the heat exchanger is shut off or interrupted so that the heat exchanger becomes progressively hotter. Again, the heat transfer medium may be gas or liquid, particularly air or water, and when the latter possibly mixed with antifreeze. When the heat transfer medium is a liquid such as water, an arrangement must be provided either to drain the heat transfer medium from the secondary side of the heat exchanger or to allow it to escape therefrom, thereby to enable the hot exhaust gases to heat the heat exchanger to the required temperature without causing the liquid heat transfer medium to evaporate or decompose. When employing a gaseous heat transfer medium, it will be sufficient to interrupt the flow of such medium at the secondary side of the heat exchanger. After the heat exchanger has reached the required temperature, for example 300° C., spontaneous ignition will occur on the primary surfaces of the heat exchanger. That is, the precipitated soot and condensed matter on such primary surfaces of the heat exchanger will burn off since the hot exhaust gases from the diesel engine always contain a residual amount of oxygen. After sufficient self-cleaning has taken place, that is to say after burning off the soot and condensed matter from the primary surfaces of the heat exchanger as completely as possible, then circulation of the heat transfer medium can be resumed. In the case of a liquid heat transfer medium, the secondary surfaces of the heat exchanger must be allowed to sufficiently cool to avoid evaporation or decomposition of such medium. For instance, it would be possible to pass air through the secondary side of the heat exchanger to achieve such necessary cooling. Also, it would be possible to interrupt the flow of the hot exhaust gases to allow self cooling. In any case, it is believed that one skilled in the art readily would understand the various manners by which it would be possible to insure sufficient cooling of the heat exchanger after regeneration thereof and prior to recommencement of a normal, partial cleansing operation thereby.

In accordance with the present invention, only a single heat exchanger is regenerated at any given time, and during such regeneration, all of the other heat exchangers of the apparatus continue to be operated during a normal partial cleansing and cooling operation of those diesel exhaust gases being passed thereto from the other cylinders of the diesel engine.

It is of course true that during the regeneration of one heat exchanger the exhaust gases discharged therefrom will be heated. However, such hot exhaust gases are mixed with the cooled exhaust gases discharged from all of the other heat exchangers, such that the temperature of the resultant combination of mixed exhaust gases will be sufficiently low for introduction into the electrostatic precipitation device. In other words, the present invention insures that the exhaust gases introduced into the electrostatic precipitation device will be below a predetermined maximum temperature, for example 80° C., above which operation of the electrostatic precipitation device would be impaired.

In accordance with the present invention, as indicated above, after the completion of a regeneration operation and before recommencement of a normal, partial cleansing operation by a given heat exchanger, the flow of hot exhaust gases to that heat exchanger can be terminated for a given or predetermined period of time. This can be done, for example, by interrupting the injection of diesel fuel to the injector of the particular cylinder or cylinders that supply exhaust gas to that given heat exchanger. This prevents further heating of that particular heat exchanger. Interruption of the injection of the diesel fuel also is advantageous because cooling of the respective heat exchanger takes place immediately after the burning-off process of the regeneration operation. This feature of the present invention particularly is advantageous if the heat transfer medium employed is a liquid medium, such as water or water mixed with antifreeze.

Additional cleansing of the exhaust gases that leave the heat exchangers occurs by means of the electrostatic precipitation device. This device achieves electrostatic electrification and precipitation of soot particles and condensable matter in the partially cleansed exhaust gases. Customary electrostatic precipitators may be used, for example electrostatic filters of the type described in VDI (Verein Deutscher Ingenieure) Reports No. 559, pp. 102-103. Electrostatic precipitation can be carried out as a so-called "silent discharge", but preferably is achieved as a so-called "spray discharge" or "corona discharge". Such a spray discharge can be achieved at voltages of 5-30 kilovolts if a suitable spray or precipitation electrode is used, preferably in the form of a thin wire of, for example, 0.2 mm diameter within a suitable collecting tube, which can have a round or also a square cross section and which serves as a collector electrode. A suitable length for a tube serving as a collector electrode may be from 0.3 to 1.5 meters. The rate of flow of the exhaust gases preferably should be under two meters per second, and the length of contact in the electrostatic precipitation device should be at least 0.5 seconds.

BRIEF DESCRIPTION OF THE DRAWING

Other Objects, features and advantages of the present invention will be apparent from the following detailed description, taken with the accompanying drawing, wherein:

The single figure is a schematic plan view of a ten-cylinder diesel engine adapted to include the apparatus of the present invention for carrying out the process of the present invention.

DETAILED DESCRIPTION OF THE INVENTION

As shown in the drawing, diesel engine 2 includes a plurality of individual cylinders 1, each of which issues hot exhaust gases. In the drawing, engine 2 includes ten cylinders 1 but it would be understood by one skilled in the art that the engine could include a different number of cylinders.

In the illustrated arrangement, each of the cylinders 1 is allocated in individual heat exchanger 3 that is operable entirely independently of the other heat exchangers. More particularly, each heat exchanger 3, shown only schematically, is individually and separably operable for a partial cleansing operation and for a regeneration operation. For example, a normal, partial cleansing operation may be achieved by passing a heat transfer medium through a secondary side of the heat exchanger, a feed conduit 8 and a discharge conduit 9 being schematically illustrated for each heat exchanger. The hot exhaust gases from each of the ten cylinders pass through respective individual primary sides of the respective heat exchangers 3. Soot and condensable matter thereby are precipitated in a known manner. The exhaust gases discharged from each of the ten heat exchangers 3 are all combined, for example at mixing point 6, and such combined gases then are passed through an electrostatic precipitation device 4 wherein further and additionally cleansing occurs. Illustrated at 7 is an exhaust pipe to the atmosphere from electrostatic precipitation device 4.

In accordance with the present invention, when it becomes necessary to regenerate one or more of the heat exchangers 3, only a single heat exchanger is regenerated at a given time. The exhaust gases from the respective cylinder continue to flow through that heat exchanger both during regeneration and during previous and subsequent partial cleansing. During regeneration the heat transfer medium is interrupted, such that self ignition and burning away of the precipitated soot and condensable matter occurs. During this operation the exhaust gases that are discharged from that particular heat exchanger are of course hot. However, these exhaust gases are mixed with the cooled exhaust gases from the other nine heat exchangers and it is this mixture of gases that is supplied to the electrostatic precipitation device 4.

In accordance with the present invention, experiments have shown that a cleansing cycle of a heat exchanger is required after driving a distance of approximately 200 to 1000 km.

Although the present invention has been described illustrated with respect to preferred features thereof, it is to be understood that various changes and modifications may be made to the specifically described and illustrated features without departing from the scope of the present invention.

I claim:

1. In a process for cleansing hot exhaust gases from a diesel engine having plural cylinders by removing from said exhaust gases soot and condensable matter, wherein said hot exhaust gases are cooled and partially cleansed by being passed through a heat exchanger in heat exchange relation with a heat transfer medium, during which part of the soot and condensable matter in said exhaust gases precipitate therefrom as a precipitate onto said heat exchanger, thereby forming partially cleansed and cooled exhaust gases which then are passed through an electrostatic precipitation device and further cleansed thereby, whereby said precipitate eventually builds up on said heat exchanger, and for regenerating said heat exchanger to remove therefrom built-up precipitate by interrupting said heat transfer medium in said heat exchanger such that said hot exhaust gases passing therethrough heat said precipitate to cause incineration thereof, during which regeneration partial cleansing of exhaust gases is performed in another heat exchanger, whereby said heat exchangers are operated alternately for partial cleansing and regeneration, the improvement comprising:

providing a plurality of said heat exchangers, with each said heat exchanger being operable for partial cleansing and for regeneration independently of the operation of the other said heat exchangers;

passing said hot exhaust gases from each of said cylinders of said diesel engine individually through only a selected respective one of said heat exchangers;

operating only a single of said heat exchangers at a time for regeneration thereof, such that the remainder of said heat exchangers are operated for partially cleansing; and combining said exhaust gases from all of said heat exchangers and then passing the thus combined exhaust gases through said electrostatic precipitation device and therein further cleansing said combined exhaust gases.

2. The improvement claimed in claim 1, comprising connecting said heat exchangers in parallel between said cylinders and said electrostatic precipitation device.

3. The improvement claimed in claim 1, further comprising, when a selected said heat exchanger is operated for regeneration, then after completion of said regeneration, interrupting the supply of fuel to an injection nozzle of the respective said cylinder, thereby interrupting the supply of hot exhaust gases therefrom and facilitating cooling of said selected heat exchanger prior to recommencement of partial cleansing thereby.

4. The improvement claimed in claim 1, wherein each said heat exchanger has supplied thereto the said hot exhaust gases from only a selected single one of said cylinders.

5. The improvement claimed in claim 1, wherein each said heat exchanger has supplied thereto the said hot exhaust gases from two selected said cylinders.

6. In an apparatus for cleansing hot exhaust gases from a diesel engine having plural cylinders by removing from the exhaust gases soot and condensable matter, wherein the hot exhaust gases are cooled and partially cleansed by being passed through a heat exchanger in heat exchange relation with a heat transfer medium,-

.during which part of the soot and condensable matter in the exhaust gases precipitates therefrom as a precipitate onto said heat exchanger, thereby forming partially cleansed and cooled exhaust gases which then are passed through an electrostatic precipitation device and further cleansed thereby, whereby the precipitate eventually builds up on said heat exchanger, and whereby said heat exchanger is regenerated to remove therefrom built-up precipitate by interrupting the heat transfer medium in said heat exchanger such that the hot exhaust gases passing therethrough heat said precipitate to cause incineration thereof, during which regeneration partial cleansing of exhaust gases is performed in another heat exchanger, whereby said heat exchangers are operated alternately for partial cleansing and regeneration, the improvement comprising:

a plurality of said heat exchangers, each said heat exchanger being operable for partial cleansing and for regeneration independently of the operation of the other said heat exchangers;

means for passing the hot exhaust gases from each of the cylinders of the diesel engine individually through only a selected respective one of said heat exchangers;

only a single of said heat exchangers at a time being operated for regeneration thereof, such that the remainder of said heat exchanges are operated for partial cleansing; and means for combining the exhaust gases from all of said heat exchangers and then passing the thus combined exhaust gases through said electrostatic precipitation device and therein further cleansing the combined exhaust gases.

7. The improvement claimed in claim 6, wherein said heat exchangers are connected in parallel between the cylinders and said electrostatic precipitation device.

8. The improvement claimed in claim 6, wherein said passing means supplies to each said heat exchanger the hot exhaust gases from only a selected single one of the cylinders.

9. The improvement claimed in claim 6, wherein said passing means supplies to each said heat exchanger the hot exhaust gases from two selected cylinders.

* * * * *